(12) United States Patent
Spencer et al.

(10) Patent No.: US 9,896,073 B2
(45) Date of Patent: Feb. 20, 2018

(54) METHOD AND DEVICE FOR CARRYING OUT COLLISION-AVOIDING MEASURES

(71) Applicant: VALEO Schalter und Sensoren GmbH, Bietigheim-Bissingen (DE)

(72) Inventors: Martin Spencer, Hamburg (DE); Michael Koehler, Hamburg (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 185 days.

(21) Appl. No.: 14/898,253

(22) PCT Filed: Jun. 6, 2014

(86) PCT No.: PCT/EP2014/061869
§ 371 (c)(1),
(2) Date: Dec. 14, 2015

(87) PCT Pub. No.: WO2014/198671
PCT Pub. Date: Dec. 18, 2014

(65) Prior Publication Data
US 2016/0144838 A1    May 26, 2016

(30) Foreign Application Priority Data

Jun. 14, 2013   (DE) .......................... 10 2013 010 004

(51) Int. Cl.
*G06F 7/70* (2006.01)
*B60T 7/22* (2006.01)
(Continued)

(52) U.S. Cl.
CPC ................................. *B60T 7/22* (2013.01); *B60T 7/12* (2013.01); *B60T 8/17558* (2013.01);
(Continued)

(58) Field of Classification Search
CPC .......... B60T 7/12; B60T 7/22; B60T 8/17558; B60T 2201/022; B60T 2210/32;
(Continued)

(56) References Cited

U.S. PATENT DOCUMENTS

| 2013/0024073 A1* | 1/2013 | Son ........................ G08G 1/166 701/45 |
| 2014/0074388 A1* | 3/2014 | Bretzigheimer .......... B60T 1/10 701/117 |
| 2014/0156157 A1* | 6/2014 | Johnson .................... B60T 7/22 701/70 |

FOREIGN PATENT DOCUMENTS

| DE | 10132386 A1 | 1/2003 |
| DE | 102005002760 A1 | 8/2005 |

(Continued)

OTHER PUBLICATIONS

International Search Report issued in corresponding application No. PCT/EP2014/061869 dated Jul. 21, 2014 (6 pages).
(Continued)

*Primary Examiner* — Hussein Elchanti
(74) *Attorney, Agent, or Firm* — Osha Liang LLP

(57) ABSTRACT

The invention relates to a method for carrying out one or more collision-avoiding measures of a vehicle, in particular a motor vehicle. In the method, the positions of static and dynamic objects 11 are detected in a step 10, and one or more trajectories 21 which avoid collisions with the detected objects 11 are determined for the vehicle in a step 20. According to the invention, a danger value 23 for the determined trajectory 21 or for each of the determined trajectories 21, is determined continuously or periodically in a further step 22. This danger value 23 constitutes a measure for the forces which act on the vehicle when the respective trajectory 21 is passed through. The collision-avoiding measures are then carried out in a step 27 if the determined
(Continued)

Figure 1:
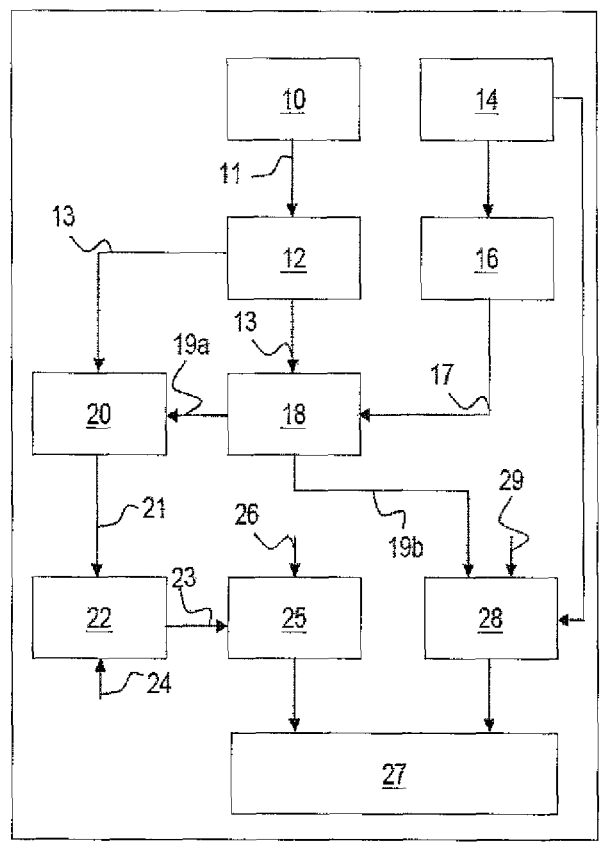

danger value 23, or the determined danger values 23, is/are above a selected or predefined threshold value 26.

In addition, the invention relates to a device for carrying out the method.

11 Claims, 2 Drawing Sheets

(51) Int. Cl.
  *B60T 7/12* (2006.01)
  *B60W 30/095* (2012.01)
  *G08G 1/16* (2006.01)
  *B60T 8/1755* (2006.01)

(52) U.S. Cl.
  CPC ........... *B60W 30/095* (2013.01); *G08G 1/165* (2013.01); *G08G 1/166* (2013.01); *B60T 2201/022* (2013.01); *B60T 2201/03* (2013.01); *B60T 2210/32* (2013.01)

(58) Field of Classification Search
  CPC .. B60T 2201/03; B60W 30/095; G08G 1/165; G08G 1/166
  USPC .......................................................... 701/70
  See application file for complete search history.

(56) References Cited

FOREIGN PATENT DOCUMENTS

| | | |
|---|---|---|
| DE | 102005014803 A1 | 10/2006 |
| DE | 102006028277 A1 | 12/2007 |
| DE | 102009047333 A1 | 6/2011 |
| DE | 102011080789 A1 | 2/2012 |
| DE | 102012203187 A1 | 9/2012 |
| DE | 102012008660 A1 | 11/2012 |
| DE | 102012009555 A1 | 11/2012 |
| DE | 102012012591 A1 | 12/2012 |
| DE | 102012216986 A1 | 3/2014 |
| EP | 2549456 A1 | 1/2013 |

OTHER PUBLICATIONS

German Search Report issued in corresponding application No. DE102013010004.6 dated Nov. 7, 2013 (5 pages).

* cited by examiner

METHOD AND DEVICE FOR CARRYING OUT COLLISION-AVOIDING MEASURES

The invention relates to a method for carrying out collision-avoiding measures according to the preamble of claim 1 and to a device for carrying out the method.

In the field of automobiles, very different driving assistance systems, that is to say electronic accessory devices for assisting the driver in specific driving situations, are being increasingly used. According to the prior art, methods and devices are known for carrying out collision-avoiding measures, in particular braking a moving motor vehicle or carrying out an avoidance manoeuvre of a moving motor vehicle.

For example, in DE 10 2005 002 760 A1, in order to avoid collisions objects are detected in the surroundings of a vehicle and a digital image of the situation is produced on the basis thereof. The collision time and a collision location for each object with the vehicle is then determined with the digital image of the situation. Then, a collision probability is determined from the parameters of the collision time and the location of the collision taking into account the uncertainty of these parameters. In the event of a collision being imminent, that is to say appearing probable, on the basis of this collision probability, an emergency manoeuvre is carried out by braking and performing an avoidance manoeuvre on a trajectory determined by means of the image of the situation.

Such methods involve pursuing the idea that in conventional driving situations braking frequently no longer serves to avoid collisions, in which case an avoidance manoeuvre or braking and an avoidance manoeuvre can still prevent a collision.

However, complete avoidance of a collision is made possible only at low speeds of the vehicle, since these methods carry out, as is also described in the abovementioned document, manoeuvres in the "physical boundary region".

So that the method does not in fact intervene prematurely in the control by the driver but instead the driver can still carry out a manual avoidance manoeuvre, the execution of braking is delayed, or a collision is assumed to be improbable, for as long as the avoidance manoeuvre on the determined trajectory still just, or even just no longer, leads past the detected objects. Particularly at relatively high speeds, such manoeuvres are frequently very dangerous and therefore lead to a collision of the vehicle with objects, albeit with reduced force.

The invention is therefore based on the object of carrying out collision-avoiding measures promptly in such a way that even at relatively high speeds a collision is avoided without early intervention in actions which are carried out, or still can be carried out, manually by the driver, in particular the manual avoidance manoeuvre.

The invention achieves this object by means of a method for carrying out collision-avoiding measures and by means of a device for carrying out the method.

According to the invention, the positions of static and dynamic objects are detected. Objects are here, in particular, other vehicles, carriageway boundaries, buildings or other obstacles which are positioned on and in the vicinity of the carriageway. In addition, one or more trajectories are determined which the vehicle can pass along and by means of which a collision of the vehicle with the objects would be avoided.

According to the invention, a danger value is then determined for the determined trajectory, or for each of the determined trajectories. The danger value is updated continuously or periodically, for example predefined by a clock of a processor processing the data to adapt it to the current position of the vehicle and of the detected objects. The danger value constitutes here a measure of the forces which would act on the vehicle when the respective trajectory is passed through. That is to say one or more forces which act on the vehicle are determined for each trajectory when it is assumed that the vehicle is passing through the respective trajectory. These forces are then combined as a danger value for the respective trajectory, for example by means of vehicle-specific tables or by means of vehicle-specific functions of the forces. The specific tables or functions are determined, for example, by behaviour models or driving trials.

The determined danger values are then compared with a threshold value which is selected beforehand for a specific vehicle, for example by the driver or by the manufacturer, or which is predefined, for example, by the manufacturer. In the event of the determined danger value, the determined danger values or one of the determined danger values being above the selected or predefined threshold value, one or more collision-avoiding measures are then carried out.

The advantage of the evaluation of the trajectories with danger values is that a collision-avoiding measure can already be carried out at such an earlier time that the collision-avoiding measure enables in all cases a controlled vehicle movement which is not in the range of the physical limits and avoids a possible collision.

According to one preferred embodiment, the current speed and the current acceleration of the vehicle are determined, and, on the basis of these parameters for the determined trajectory, or for each of the determined trajectories, the maximum lateral acceleration of the vehicle which acts on the vehicle when the respective trajectory is passed through is determined. This maximum lateral acceleration is evaluated with a probability value, for example by means of a mathematical operation. The evaluated lateral acceleration then corresponds to the danger value.

The probability value is defined in such a way that the evaluated trajectory—therefore the maximum lateral acceleration which is associated therewith—would actually be selected by a driver in order to carry out collision-avoiding measures. The danger value of a trajectory with a maximum lateral acceleration which would in fact just permit a stable driving behaviour of the vehicle but would no longer be selected by a driver—at least under usual circumstances—is therefore given, for example, a comparatively high danger value which is above the threshold value.

This advantageously takes into account the fact that when a dangerous situation, such as for example a collision, is detected, a driver would already carry out collision-avoiding measures before the limit of the forces acting on the vehicle, in particular maximum lateral acceleration, which still permit a controlled driving behaviour of the vehicle, are reached. Assuming that the driver recognizes the dangerous situation, he would therefore not wait until the "last moment" to carry out collision-avoiding measures.

According to a further advantageous embodiment, the period of time up to which a collision with the closest object located in the travel path of the vehicle would be avoided by braking the vehicle is determined. Therefore, for example the travel path, that is to say the future positions of the vehicle, is firstly predicted and the closest object which is in the region of this travel path and with which the vehicle would collide if travel is pursued on the travel path, is identified. On the basis of the speed and the acceleration of the vehicle and the position—in the case of a static object—or the predicted positions—in the case of a dynamic object—the period of time up to which braking of the vehicle is still possible without the vehicle and the object colliding with one another, is then determined.

According to a first alternative of this embodiment, a first collision-avoiding measure, for example signalling with a visual display, is carried out if the period of time undershoots a time threshold value. According to a further alternative of the embodiment, a first collision-avoiding measure, for example visual signalling, is carried out if the period of time undershoots a first time threshold value, and a further first collision-avoiding measure, for example acoustic signalling by means of a sound or a sound sequence, is carried out if the period of time undershoots a further time threshold value. The first collision-avoiding measure or measures is/are then carried out before the determined danger value or values is/are above a selected or predefined threshold value and therefore further collision-avoiding measures are carried out.

By means of the first collision-avoiding measures, which are carried out as a function of the abovementioned period of time, the driver is already warned at an early time of the danger that manual braking and/or an avoidance manoeuvre should be carried out in order to avoid a collision.

According to a further advantageous embodiment, the positions of dynamic objects are predicted continuously or periodically, the trajectories are adapted continuously or periodically to the predicted positions, and the danger values for the trajectories are determined continuously or periodically. This makes it possible that despite varying positions of the dynamic objects, collision-avoiding measures are carried out correctly each time, even in changing situations in the surroundings.

According to a further preferred embodiment, in the event of a plurality of trajectories being determined, travelling along which would avoid a collision of the vehicle with the detected objects, the trajectory whose danger value has the lowest determined maximum lateral acceleration is always selected. One or more collision-avoiding measures are carried out when the danger value of the selected trajectories is above the selected or predefined threshold value. It is advantageous that only one comparison of a danger value with the threshold value is necessary to carry out collision-avoiding measures promptly.

According to one preferred embodiment, the collision-avoiding measures comprise braking of the vehicle. The braking can take place, for example, by actuating a braking control system, for example a brake controller of the vehicle, which activates the brakes of the vehicle.

According to a further preferred embodiment, the collision-avoiding measures comprise the braking of the vehicle. According to a first alternative of the exemplary embodiment, the braking is carried out by braking, that is to say activating the brakes of the vehicle, at intervals. In this context, the braking takes place in a plurality of intervals with the same or different braking forces. According to a further alternative of the exemplary embodiment, the braking takes place continuously, in particular up to the stationary state of the vehicle. During the continuous braking process, the braking force is either constant or the braking force is increased or reduced. It is conceivable, for example, to carry out braking within a first period of, for example, one second with a low braking force followed by a second period, for example, up to the stationary state, in which second period comparatively high braking forces are applied.

According to a further preferred embodiment, a collision-avoiding measure comprises signalling a signal in the passenger compartment of the vehicle. This warns the driver of a hazardous situation, so that he can, under certain circumstances, still avoid a possible collision by means of a manually executed driving manoeuvre.

According to a further preferred embodiment, the signalling with a signal comprises displaying a visual signal, playing back a sound or a sound sequence and/or the haptic signalling for the driver of the vehicle. Such signalling selectively warns the driver about a dangerous situation, with the type of signal being able to be matched to the conditions of the vehicle or individually to the driver.

According to a further preferred embodiment, the execution of a collision-avoiding measure is interrupted by the intervention of the driver in the control of the vehicle, for example by manual braking or by means of an avoidance manoeuvre. This interruption is advantageously carried out only when the danger value or values has/have values below the threshold value again as a result of this intervention by the driver. This prevents, for example, the vehicle being braked completely even though the dangerous situation has been eliminated by the driver.

According to a further preferred embodiment, the threshold value is a threshold value selected from a plurality of selectable threshold values. The selectable threshold values correspond to a plurality of previously defined or predefined threshold values. These threshold values can, for example, be selected by the driver in order, in the event of a risk of a collision, to warn the driver particularly early about this risk. In addition, the selection of such a threshold value permits particularly early automatic braking in the case of an imminent risk of a collision if the driver wishes it. In the event of the driver wishing that the method should intervene particularly late, for example another threshold value is then selected.

Figure 2:
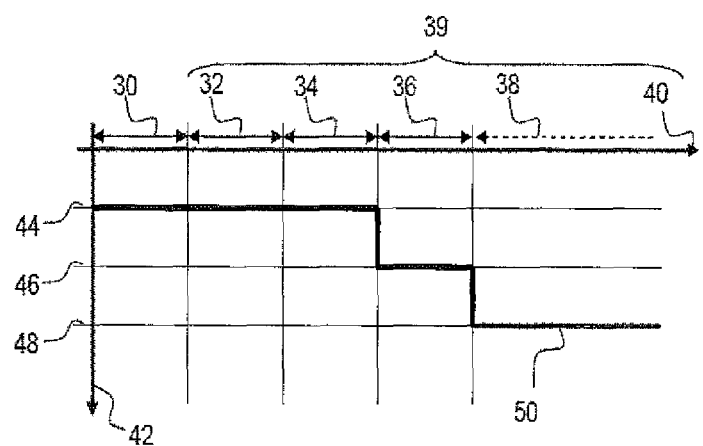
Figure 3A:
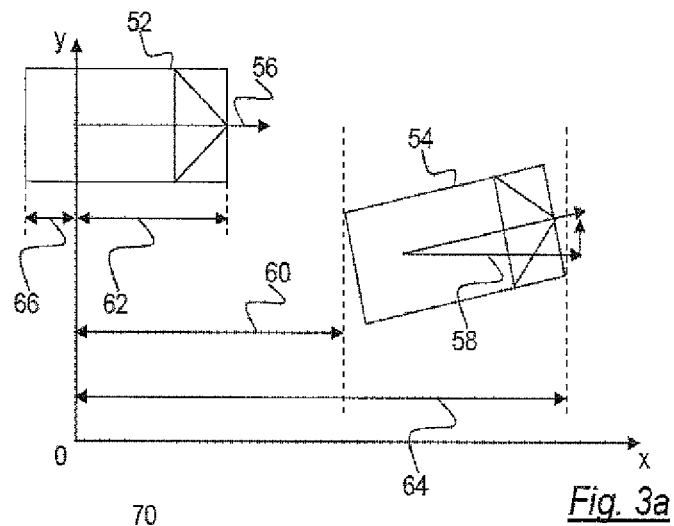
Figure 3B:
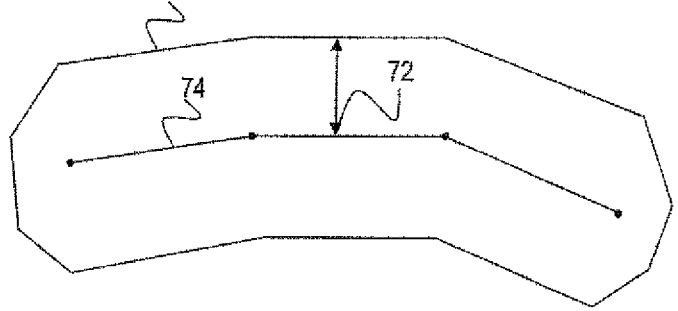
Figure 3C:
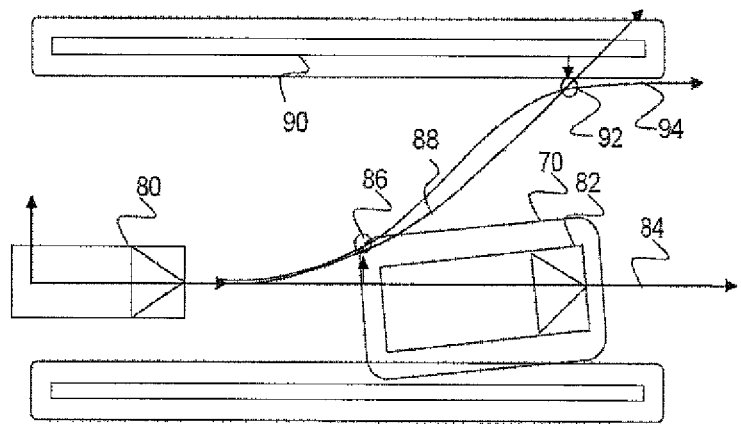

Further embodiments of the invention result from the dependent claims and from the exemplary embodiments which are explained in more detail with reference to the drawing. In the drawing:

FIG. 1 shows the sequence of an exemplary embodiment of the method according to the invention, FIG. 2 shows the execution of successive first and further collision-avoiding measures, and FIGS. 3a-c show the determination of collision-avoiding trajectories.

FIG. 1 shows the sequence of an exemplary embodiment of the method according to the invention. According to the method, in a step 10 positions of objects 11 are firstly detected. The detection is carried out, for example, by laser scanning with a laser scanner which is mounted on a vehicle. These objects 11 can be static objects, for example parked vehicles and/or path boundaries and dynamic objects, for example vehicles travelling ahead or oncoming vehicles. In the case of detection, all the objects 11 in the surroundings of the vehicle are detected, in order to process their positions simultaneously.

For the dynamic objects 11, future positions 13 are then predicted in a step 12 by means of additionally detected movements of the dynamic objects 11. An unexpected movement of the object 11 is therefore predetermined.

In addition, the movement, in particular the speed and the acceleration, of the vehicle, that is to say the "driver's vehicle", with which the method is carried out, is detected in a step 14. By taking into account the current speed and the current acceleration, a travel path 17 which the vehicle will supposedly travel along is then predicted in step 16. With the predicted travel path 17 of the vehicle, and with the positions and future positions 13 of the detected objects 11, objects 19a which are supposedly located in the region of the travel path of the vehicle are identified in a step 18. In addition, the object 19b which is assumed to be located next in the travel path of the vehicle, that is to say constitutes the closest obstacle to the vehicle, is determined in this step 18.

In step 20, all the possible trajectories 21 which lead the vehicle past the detected objects 19b without a collision are then determined on the basis of the current and future positions 13 of the detected objects 19b. The positions 13 of the objects 19b and therefore also the possible trajectories 21 are preferably updated continuously or periodically.

The determined trajectories 21 are then evaluated in a step 22, and a danger value 23 is determined for each of the trajectories 21 here. The danger value 23 of a trajectory 21 constitutes a measure of one or more forces which would act on the vehicle when the respective trajectory 21 is passed through. According to one exemplary embodiment, the maximum lateral acceleration which would act on the vehicle when the respective trajectory 21 is passed through is determined on the basis of the current speed and acceleration of the vehicle. This maximum lateral acceleration is then evaluated with a probability value 24 which constitutes a measure of whether the driver would carry out an avoidance manoeuvre with a lateral acceleration which is comparable to the determined lateral acceleration. The result of this evaluation, that is to say the evaluated lateral acceleration, is then assigned to the respective trajectory 21 as a danger value 23. The danger values 23 are also continuously or periodically updated in accordance with the abovementioned continuous or periodic updating of the trajectories 21.

In the subsequent step 25, the determined danger values 23 are compared with a threshold value 26. If all the danger values 23 exceed the threshold value during the updating of the danger values, in step 27 a collision-avoiding measure, in particular braking of the vehicle, is carried out. A collision-avoiding measure is therefore carried out if every determined trajectory 21 which leads past the obstacle or obstacles (objects 19a) would apply lateral acceleration to the vehicle which there is a high probability 24 of the driver not selecting. This means that if a collision-avoiding measure is carried out, this measure takes place so promptly that although it would be possible to pass through trajectories 21 which would lead past the objects 19a without a collision, this measure takes place so late that intervention by the driver is improbable, and the driver therefore has not recognized the dangerous situation.

According to this exemplary embodiment, the period of time up to which execution of braking, in particular when the travel path 17 continues to be followed, is still possible in order to avoid a collision with the closest object 19b, is determined in the step 28, additionally on the basis of the speed and movement determined in step 14 and on the basis of the position of the object closest in the travel path of the vehicle, determined in step 18. This period of time is compared with one or more time threshold values 29, and a first collision-avoiding measure, in particular visual or acoustic signalling in the passenger compartment of the vehicle, is carried out when one of the time threshold values 29 is undershot or whenever it is undershot.

The execution of subsequent first and further collision-avoiding measures, such as occurs in step 27, is illustrated according to an exemplary embodiment in FIG. 2.

FIG. 2 shows a travel situation of the vehicle in the regions 30 to 38. In the regions 32 to 38 different successive collision-avoiding measures 39 are carried out. These are plotted on a time axis 40. The negative acceleration, that is to say the braking force which, during braking, acts on the vehicle as a result of braking, is represented on the axis 42. The line 44 corresponds to the zero line during which the vehicle is therefore not braked. The line 46 corresponds to braking with a first low force, and the line 48 corresponds to braking with a second comparatively high force. The intervention by collision-avoiding measures 39 in the event of danger is represented by the (bold) curve 50.

In the first region 30, the vehicle is travelling normally. In the second region 32, the determined period of time up to which braking has to be carried out in order to avoid a collision with the closest object 19b in the travel path undershoots a first time threshold value 29. In this region 32, a first collision-avoiding measure 39 is carried out. For example, it is displayed visually to the driver that braking should take place soon. In the region 34, the determined period of time undershoots a further time threshold value 29, since the vehicle is, for example, again approaching an object 19b. Here a further collision-avoiding measure 39 is carried out. The driver is warned, for example acoustically by means of a sound or a sound sequence, that the risk of the collision has increased and immediate braking should take place.

If the driver does not react by manually braking, the danger values 23 of the possible trajectories 21 rise, since an avoidance manoeuvre would still be possible only with relatively high lateral accelerations. In the regions 36 and 38, the danger values 23 of the trajectories 21 then exceed the threshold value 26, and a further collision-avoiding measure 39 is carried out. The vehicle is braked. In the region 36, the vehicle is firstly braked slightly, for example for a second, in order to give the driver the possibility of avoiding a collision manually. If the driver still does not react, in region 38 the vehicle is braked severely until it comes to a standstill, for example.

According to one exemplary embodiment, the time threshold values 29 and the severity and duration of the braking can be configured.

FIGS. 3a to 3c show the detailed determination of the trajectories 21 which lead past determined objects 19a, according to an exemplary embodiment of the invention.

FIG. 3a shows the vehicle 52 which corresponds to the driver's vehicle, and a detected object 54 which corresponds, for example, to a further vehicle and is located in the travel path of the vehicle 52. On the basis of a coordinate system with the axes x and y, the vehicle 52 moves at a speed 56 in the direction x. The object 54 also moves and therefore corresponds to a dynamic object. Here, the object 54 moves in another direction to the vehicle 52, wherein the object 54 also moves in the direction x at a speed 58 when the directional components are decomposed.

The times are determined which the vehicle 52 takes to reach the object 54, and the vehicle 52 takes to pass the object 54. The time until the object is reached is plotted from the difference between the minimum distance 60 of the object 54 to the zero point of the x axis and the maximum distance 62 of the vehicle 52 to the zero point of the x axis divided by the difference between the speed 56 of the vehicle 52 and the speed 58 of the object 54 in the x direction. The time until the object is passed is obtained from the difference between the maximum distance 64 of the object 54 to the zero point of the x axis and the minimum distance 66 of the vehicle 52 to the zero point of the x axis divided by the difference between the speed 56 of the vehicle 52 and the speed 58 of the object 54 in the x direction.

In order to determine the trajectories 21, the position of the object 54 is predicted at both plotted times or points in time, and a trajectory 21 is determined which leads past these two positions of the object 54 and the path which the object 54 travels along between these two positions.

FIG. 3b shows a region 70, in which the vehicle 52 cannot move due to detected objects 11, which region 70 therefore cannot be passed through as the trajectory 21. In this context it is assumed that the objects 11 are located on the curve 74. A region 70, which always has a distance 72 from the curve 74, that is to say from the objects 11 which corresponds to at least half the width of the vehicle 52, is defined around this curve 74. This region 70 is approximated to a smoothed (here convex) shape by means of offset straight lines during the determination.

FIG. 3c shows the determination of the trajectories 21 according to an exemplary embodiment on the basis of checking points, through which cubic splines or cubic polynomial lines are made to pass. For this purpose, a unidimensional presentation of the vehicle and of the determined objects 11 is selected. FIG. 3c shows for this purpose a vehicle 80 and a detected object 82, which is illustrated here as a further parked vehicle, that is to say as a static object. The region 70 which is illustrated in FIG. 3b is illustrated around the vehicle. A travel path 84 is firstly assumed. Here, the detected object 82 constitutes an obstacle. A checking point 86 is generated thereon, at the corner of the object 82, plus a safety distance defined by the region 70. A cubic spline 88 is made to pass through this checking point 86. In its course said cubic spline 88 meets a further object 90. As before, a new checking point 92 and a new spline 94 are generated, which spline 94 passes through the second checking point 92 and therefore also passes by the second object. Smoothed trajectories 21, passages by way of which the vehicle would avoid collisions, are therefore generated.

All the features specified in the above description and in the claims can be used individually or in any desired combination with one another. The disclosure of the invention is therefore not restricted to the described or claimed combination of features. Instead, all combinations of features are to be considered as being disclosed.

LIST OF REFERENCE SIGNS

10 Detection of objects
11 Detected objects
12 Prediction of positions of the objects
13 Future positions of the objects
14 Detection of movement of the driver's vehicle
16 Prediction of the travel path of the driver's vehicle
17 Predicted travel path of the driver's vehicle
18 Determination of the objects located in the travel path
19a Objects located in the travel path
19b First object located in the travel path
20 Determination of trajectories
21 Trajectories
22 Determination of danger values
23 Danger values
24 Probability value
25 Comparison of danger values with a threshold value
26 Threshold value
27 Execution of collision-avoiding measures
28 Determination of a period of time up to which braking is possible
29 Time threshold value
30 Region of normal travel of the vehicle
32 Region of signalling with a visual display
34 Region of acoustic signalling
36 Region of braking with lower braking force
38 Region of braking with higher braking force
39 Collision-avoiding measures
40 Time axis
42 Acceleration axis
44 Zero line
46 Lower braking force
48 Higher braking force
50 Progression of the execution of collision-avoiding measures
52 Vehicle
54 Detected object
56 Speed of the driver's vehicle
58 Speed of the detected object
60 Minimum distance of the object from the zero point of the x axis
62 Maximum distance of the vehicle from the zero point of the x axis
64 Maximum distance of the object from the zero point of the x axis
66 Minimum distance of the vehicle from the zero point of the x axis
70 Region which cannot be passed through
72 Distance of half the width of the vehicle
74 Curve on which objects are located
80 Vehicle
82 Detected object
84 Travel path
86 Checking point
88 Spline
90 Further object
92 Checking point
94 Spline

The invention claimed is:

1. A method for carrying out one or more collision-avoiding measures in a motor vehicle, comprising:
    detecting positions of static and dynamic objects;
    determining at least one trajectory which avoid collisions of the vehicle with the detected objects;
    determining a danger value for each of the determined at least one trajectory,
        wherein in order to determine the danger value on the basis of the current speed and acceleration of the vehicle, a maximum lateral acceleration of the vehicle is determined when the at least one trajectory is passed through, the lateral acceleration being evaluated using a probability value, wherein the probability value constitutes a measure of whether the driver would carry out a manoeuver with a lateral acceleration which is comparable with the determined lateral acceleration, wherein the evaluated lateral acceleration then corresponds to the at least one danger value,
    wherein the danger value is determined continuously or periodically and is a measure of one or more forces which would act on the vehicle when the at least one trajectory is passed through; and
    carrying out the collision-avoiding measures in the event of at least one of the determined at least one danger values being above a selected or predefined threshold value.

2. The method according to claim 1, wherein a period of time up to which a collision with the closest object located in the travel path of the vehicle is avoided by braking the vehicle is determined, and a first collision-avoiding measure is carried out when the period of time undershoots a time threshold value or a plurality of collision-avoiding measures are respectively carried out when one of a plurality of time threshold values are undershot before the at least one danger value is above the threshold value.

3. The method according to claim 1, wherein in order to determine the at least one trajectory for the vehicle, the positions of dynamic objects are predicted continuously or periodically, and the at least one trajectory are adapted to the predicted positions continuously or periodically.

4. The method according to claim 1, wherein in the event of a plurality of trajectories being determined, the danger value of that trajectory with the lowest determined maximum lateral acceleration is selected and the collision-avoiding measures are carried out if the selected danger value is above the selected or predefined threshold value.

5. The method according to claim 1, wherein one of the collision-avoiding measures comprises the braking of the vehicle.

6. The method according to claim 5, wherein the braking takes place by means of intervals with the same or different braking forces or by means of a continuously applied braking force with constant increasing or decreasing braking force.

7. The method according to claim 1, wherein one of the collision-avoiding measures comprises signalling a signal in the passenger compartment of the vehicle.

8. The method according to claim 7, wherein the signalling of the signal comprises displaying a visual signal, playing back a sound or a sound sequence and/or the haptic signalling for the driver of the vehicle.

9. The method according to claim 1, wherein the execution of a collision-avoiding measure is interrupted by the intervention of the driver in the control, in particular by means of manual braking.

10. The method according to claim 1, wherein the threshold value is defined by making a selection from a plurality of predefined threshold values, before the method is carried out.

11. A device for carrying out one or more collision-avoiding measure in a motor vehicle, the device comprising:

a laser scanner configured to detect positions of static and dynamic objects;

an electronic accessory device for assisting a driver of the motor vehicle, the electronic accessory device configured to:

determine at least one trajectory which avoid collisions of the vehicle with the detected objects, determine a danger value for each of the determined at least one trajectory, wherein in order to determine the danger value on the bases of the current speed and acceleration of the vehicle, a maximum lateral acceleration of the vehicle is determined when the at least one trajectory is passed through, the lateral acceleration being evaluated using a probability value, wherein the probability value constitutes a measure of whether the driver would carry out a manoeuver with a lateral acceleration which is comparable with the determined lateral acceleration, wherein the evaluated lateral acceleration then corresponds to the at least one danger value, wherein the danger value is determined continuously or periodically and is a measure of one or more forces which would act on the vehicle when the at least one trajectory is passed through, and carry out the collision-avoiding measures in the event of at least one of the determined at least one danger values being above a selected or predefined threshold value, comprising activating at least one selected from a group consisting of a visual warning, an acoustic warning and a braking of the vehicle.

* * * * *